United States Patent [19]

Hutchins

[11] Patent Number: 4,980,917

[45] Date of Patent: Dec. 25, 1990

[54] METHOD AND APPARATUS FOR DETERMINING ARTICULATORY PARAMETERS FROM SPEECH DATA

[75] Inventor: Sandra E. Hutchins, Del Mar, Calif.

[73] Assignee: Emerson & Stern Associates, Inc., San Diego, Calif.

[21] Appl. No.: 289,540

[22] Filed: Dec. 27, 1988

Related U.S. Application Data

[63] Continuation of Ser. No. 121,928, Nov. 18, 1987, abandoned.

[51] Int. Cl.$^5$ .............................................. G01L 5/04
[52] U.S. Cl. ........................................ 381/41; 381/42; 364/513.5
[58] Field of Search ................................ 381/36–43; 364/513.5

[56] References Cited

U.S. PATENT DOCUMENTS

| | | |
|---|---|---|
| 3,410,003 | 11/1968 | Sovijarvi et al. .................... 434/185 |
| 3,881,059 | 4/1975 | Stewart .................................. 381/48 |
| 4,063,035 | 12/1977 | Appelman et al. .................... 381/48 |
| 4,081,605 | 3/1978 | Kitawaki et al. . |
| 4,081,607 | 3/1978 | Vitols et al. . |
| 4,096,645 | 6/1978 | Mandl ................................... 434/185 |
| 4,104,625 | 8/1978 | Bristow et al. ........................ 381/48 |
| 4,156,868 | 5/1979 | Levinson . |
| 4,181,813 | 1/1980 | Marley . |
| 4,181,821 | 1/1980 | Pirz et al. . |
| 4,218,836 | 8/1980 | Acres .................................... 434/185 |
| 4,292,469 | 9/1981 | Scott et al. . |
| 4,336,421 | 6/1982 | Welch et al. . |
| 4,343,969 | 8/1982 | Kellett .................................. 381/45 |
| 4,383,135 | 5/1983 | Scott et al. . |
| 4,400,828 | 8/1983 | Pirz et al. . |
| 4,435,617 | 3/1984 | Griggs .............................. 381/43 X |
| 4,468,204 | 8/1984 | Scott et al. . |
| 4,471,459 | 9/1984 | Dickinson et al. |
| 4,507,750 | 3/1985 | Frantz et al. ...................... 381/41 X |
| 4,581,756 | 4/1986 | Toqawa et al. ....................... 381/43 |
| 4,672,667 | 6/1987 | Scott et al. ........................... 381/41 |
| 4,703,504 | 10/1987 | Vittorelli .............................. 381/51 |
| 4,757,541 | 7/1988 | Beadles ................................ 381/43 |
| 4,783,805 | 11/1988 | Nishio et al. ................. 364/513.5 X |
| 4,783,807 | 11/1988 | Marley ................................. 381/43 |

Primary Examiner—Mark O. Budd
Assistant Examiner—Emanuel Todd Voeltz
Attorney, Agent, or Firm—Kirkland & Ellis

[57] ABSTRACT

A system and method for determining from continuous speech, the instantaneous values of a set of articulatory parameters. The continuous speech data is a sequence of spectral profiles obtained by spectrally sampling continuous speech. The spectral samples are presented in sequence to a plurality of class transforms, each establishing a respective speech phoneme class which includes plurality of speech phoneme having similar spectral and articulatory characteristics. Each class transform converts a speech segment included in its class and contained in a spectral sample into a predetermined set of articulatory parameter values. A class-discriminating transform operates in parallel with the class transforms to produce a set of probability values, each indicating the probability that the spectral sample being transformed represents a phoneme in a respective speech phoneme class. An array of multipliers adjusts the predetermined values of the sets produced by the class transforms by multiplying the values of each set by the probability value produced for that set by the class-discriminating transform. The adjusted articulatory parameter value sets are combined by adding corresponding elements to produce a set of adjusted articulatory parameter values indicative of an articulatory tract configuration appropriate for producing the sampled speech.

38 Claims, 6 Drawing Sheets

METHOD AND APPARATUS FOR DETERMINING ARTICULATORY PARAMETERS FROM SPEECH DATA

This invention was made with government support under SBIR Contracts 300-86-0084 and 300-87-0074 awarded by the Department Of Education. The government has certain rights in this invention.

This is a continuation of co-pending application Ser. No. 121,928 filed on Nov. 18, 1987 now abandoned.

BACKGROUND OF THE INVENTION

1. Field of the Invention

The present invention relates to speech processing and analysis and more particularly to a method and apparatus for determining the presence and status of predefined articulation parameters used in generating speech data. The invention further relates to a system for displaying a sectional view of anatomical changes occurring during the speech process, based on variations in the articulatory parameters.

2. Background of the Art

The art of creating proper speech in a given language is perhaps the most complex and difficult of learned behaviors or tasks undertaken. How to speak and understand speech occupies a large part of every child's education, whether schooled or not, because speech is such an important aspect of effective communication.

However, many individuals suffer from physical or mental impairments or impediments which make it more difficult than usual to acquire and maintain "good" speaking skills. Some individuals face re-learning speech skills lost as a result of trauma. Others must acquire a new language, which requires learning new skills that often conflict with already-established speech patterns. If any of these individuals cannot acquire the ability to more effectively communicate, they may experience serious difficulty functioning in social, work, or educational situations. Often speech problems reinforce class distinctions or prejudices, and also have grave economic consequences.

It is, therefore, important to be able to assist many individuals in acquiring proper speech skills beyond the typical scholastic approach. It is also important to accomplish speech training in the most efficient or effective manner possible. Efficiency is important because frustration and boredom with training or therapy regimes can inhibit the learning process. In a sense, progress or success depends on the level of frustration. This holds true for all individuals from inherently inattentive or active children, to overly anxious adults.

However, current speech therapy or training tends to rely on techniques that are either laborious, uninvolving, or incomprehensible to the student. One primary training technique is the use of static pictures or representations of the exterior of the vocal tract to show vocalization of various sounds or phonemes. Unfortunately, students have difficulty relating such views with complex internal (and unseen) anatomical manipulations required for speech. This lack of direct correlation between muscular motion or control and sound output makes it difficult to effectively alter speech patterns.

Constant repetitive exercise with a therapist can help but still fails to overcome the correlation problem. A trained therapist relies on subjective and laborious clinical observations of the trainee or student to formulate an explanation of what the student is doing incorrectly, and what needs changing. Aside from the problem of boredom for the patient or subject, direct correlation between generated speech or sound and vocal tract manipulation is not achieved.

A variety of complex signal processing and spectral display devices have also been used by therapists to establish or record spectral patterns for use as articulation indicators. Unfortunately, spectral displays are generally so complex and signal analysis approaches require such mastery, that the subject receives no useful feedback or information.

Alternate approaches include the use of computerized spectral templates or look up tables to which speech data is compared to determine its closest fit and, therefore, the probable articulation process employed. Such approaches, however, are speaker dependant and frequently fail to correctly relate the predetermined, stored data with the speech uttered by a subject.

It is believed that people would improve or alter their speech easier or more effectively if they had a better understanding of both what an ideal articulatory process should be as well as what they are apparently doing incorrectly when they utter speech. That is, speech training can be far more effective when the subject sees a direct correlation between sounds generated and the physical processes required. For this and other reasons, such as development of speech entry systems, there has been and continues to be a significant amount of research into understanding the speech process.

Much of this research has sought to establish and quantify articulatory parameters for human speech which could be used to generally improve speech therapy and training techniques. Several signal processing techniques such as linear predictive coding and formant tracking have been developed as a result of articulation research.

The linear predictive coding (LPC) approach utilizes an idealized model of a vocal tract and computations of area functions at discrete points along the model to predict anatomical changes required for generating various sounds. However, the idealized model does not correspond with actual vocal anatomy, but is a mathematical construct that can produce anomalous operating characteristics. The LPC approach also fails to account for factors such as the variation of formant bandwidth from speaker to speaker and nasality. Therefore, this approach has proven unreliable in estimating articulator activity even for a single speaker.

The formant tracking approach determines articulation parameters based on the position of formants derived from spectral data. However, there are reliability and reproducibility problems associated with tracking formants in continuous speech data. For example, it is extremely difficult to reliably find formant peaks. In manual formant tracking, the marking of formant tracks is often based on subjective criteria which also affects reproducibility. At present, formant tracking has proven to be too unreliable to support consistent and accurate estimation of articulatory features.

All of these and other problems have limited the progress of incorporating automatic signal processing into speech training and therapy. What is needed is a method and apparatus for determining the status of articulatory parameters that operate substantially in real time. It is also desirable to have a method of determining the status of articulatory parameters that provides dynamic visual feedback, is not speaker dependent, and can accommodate a large variety of subjects.

SUMMARY

In view of the above shortcomings and problems in the art of speech processing and its application to therapy, one purpose of the present invention is to provide a method and apparatus for determining the values of a predefined set of articulatory parameters in audio speech data.

Another purpose of the present invention is to provide a speaker-independent method and apparatus for determining, from continuous oral speech, the values of a predetermined set of articulatory parameters which represent the configuration of the vocal anatomy that produces the speech.

An advantage of the present invention is that it provides a method and apparatus for ascertaining the values of a series of articulatory parameters descriptive of anatomy which produces human speech.

Another advantage of the present invention is that it provides a method of accurately interpreting articulatory parameters for representing articulation of individual phonemes.

Yet another purpose of the present invention is to provide a method of evaluating a set of articulatory parameters which allows visual representation of anatomical features of the vocal tract in response to changes in the parameter status.

These and other objects, purposes, and advantages of the present invention are realized in a method and system for determining the values of articulatory parameters that represent articulation tract configuration during the production of oral speech. In this regard, "articulatory parameters" are parameters which, collectively, describe a cross-sectional representation of vocal tract anatomy. Each parameter corresponds to a respective portion or sector of the anatomical representation, and the value of the parameter signifies the displacement or instantaneous location of the represented anatomical portion with respect to an initial location. In the theory of the invention described herein, the speech produced by the represented vocal anatomy is composed of a continuous sequence of "spectra". The spectra of interest in understanding the preferred embodiments of the invention are associated with phonemes, which are taken to be the most basic, distinguishable units of speech in a given language.

The present invention includes a method for determining, from speech, the values of articulatory parameters indicative of the configuration of an articulatory tract producing such speech. The method includes the steps of establishing a plurality of speech phoneme classes, each including a plurality of speech phonemes sharing similar spectral and articulatory characteristics, providing digital speech data, monitoring energy levels in the digital speech data, and selecting segments of the data for analysis based on predefined magnitude changes in data energy. The selected segments are processed by an FFT algorithm, preferably after filtering and application of a windowing algorithm, to provide digital spectral data segments. The log of the magnitude of the spectral segments is conditioned to remove signal variations below a preselected signal magnitude, which eliminates noise and ambiguous information.

The resultant spectral data segments are multiplied with a class distinction of selection matrix multiplier to provide a vectorial representation of the probability of which class of a plurality of predefined spectral classes the sound being received falls into. At the same time, the spectral data segments are applied to a plurality of class matrix multipliers which provide vectorial outputs representative of predetermined articulatory parameter values. The class distinction vector information is directed to a plurality of multipliers for combination with the output of the class matrix multipliers so that a weighted average of class vectors is generated for a given sound. A summation means is employed to combine the resultant class vectors to form a single feature vector whose elements are the articulatory parameter values for the speech data being processed.

The method of the present invention can further comprise the steps of generating an image representative of a mid-sagital view of human vocal tract anatomy, associating the articulatory parameters with corresponding anatomical points on this image and altering the image according to variations in the articulatory parameter values. This image processing can be accomplished in real time with direct or pre-recorded speech data to assist in speech therapy.

The system for deriving the values of a set of articulatory parameters from speech data according to the invention is more particularly summarized as a sampling circuit for sampling speech data at a predetermined sampling rate and for selecting data segments of said speech data of predetermined length at predetermined sampling intervals according to particular changes in energy in the speech data. A transformation processor connected in series with the sampling means receives the selected data segments and transforms them from time-varying amplitude data into spectral data segments. A first mapping means connected to the transformation processor associates spectral data in each of the spectral data segments with one or more of a plurality of predefined spectral classes so as to generate a weight for the probability that said segments correspond to spectra within each of the classes. A second mapping means is connected in series with the transformation processor and in parallel with the first mapping means for transforming spectral data in each of the spectral data segments into a set of articulatory parameter values for each of the plurality of classes. A combination means is connected to the first and second mapping means for combining the weight for the probability of a given class with the mapping into the articulatory parameter values for each class so as to generate a single, weighted N parameter output, whose elements are the articulatory parameters for the speech data being processed.

The sampling circuit embraces a digitizing means for sampling speech data at a predetermined sampling rate and for forming digital speech data therefrom, an energy monitoring means for monitoring changes in energy in the sampled speech data, and a segment selection means connected to the energy monitoring means for selecting segments of the digital speech data of predetermined length at predetermined sampling intervals according to desired changes in energy.

The energy monitor means includes a scaling means for converting digital speech data to a logarithmic amplitude scale, a delay line in series with the scaling means for applying a predetermined delay to received logarithmic speech data, and summation means connected to an output of the delay means and the scaling means for arithmetically combining speech data with delayed speech data. A trigger means connected between the summation means and segment selection means provides a selection signal to the selection means in response to an increase in the energy of the data segments for predetermined numbers of sampling periods.

The first mapping means comprises first transform matrix multiplication means for multiplying spectral data segments by a predefined class distinction matrix. A vector normalization means receives the first mapping means output and generates a normalized class vector therefrom. The second mapping means comprises second matrix multiplication means for multiplying the spectral data segments by a plurality of predefined class matrixes.

In addition, where desired, the articulatory parameter values are visually displayed as part of an animated mid-sagittal, anatomical representation on a visual display means connected to an output of the combination means. The display means comprises graphics display means for displaying a predefined graphic pattern in the form of a human articulatory tract on a visual screen, and animation means for altering the graphic pattern in response to changes in the articulatory parameters. The display is combined with real time or recorded speech data to form an improved speech therapy and training apparatus.

BRIEF DESCRIPTION OF THE DRAWINGS

The novel features of the present invention may be better understood from the accompanying description when taken in conjunction with the accompanying drawings in which like characters refer to like parts and in which.

DETAILED DESCRIPTION OF A PREFERRED EMBODIMENT

The present invention allows the identification or determination of the values of a series of predefined articulatory parameters from audio speech data. This is accomplished by converting speech data into analog signals which are pre-conditioned or filtered and then digitized. Variations in the energy level of the digitized signals are monitored through pitch tracking elements and used to select segments of the digitized signals for processing based on predetermined tracking criteria. Segments composed of a predetermined number of data samples are selected from the digital signals, filtered to enhance high frequency components, and subjected to a Fast Fourier Transformation (FFT) algorithm to generate a frequency domain image of the speech signal.

The resulting frequency domain samples are further conditioned to minimize the impact of variations and noise and then mapped according to a series of predetermined relationships into an array of desired articulatory parameters. The mapping of spectral samples into articulatory parameters utilizes multiplication of the data by a set of matrixes. Each matrix represents an established class of speech phonemes which share similar spectral and articulatory characteristics. It is asserted that the phonemes in a class, when uttered, can be rendered into like spectral patterns and are produced by corresponding configurations of the articulatory tract. The matrixes are established based upon a correspondence between known spectra and articulatory parameters through use of a phonemic correlation technique.

Figure 1:
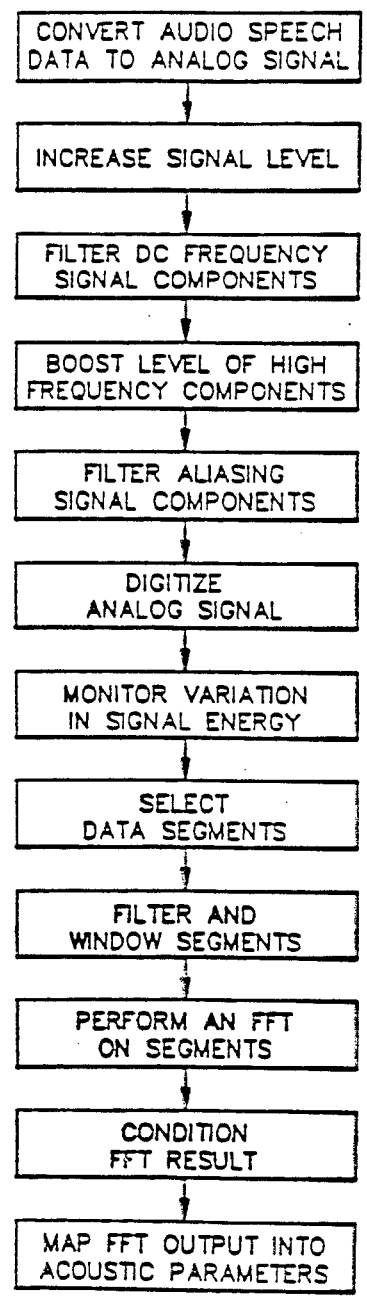
FIG. 1 illustrates a method for determining and displaying articulatory parameters from audio speech data according to the principles of the present invention.

The steps used in the method of the present invention are illustrated in flow chart form in FIG. 1. An articulatory parameter value determination apparatus 10 for implementing these steps is illustrated in schematic form in FIG. 2.

Figure 2:
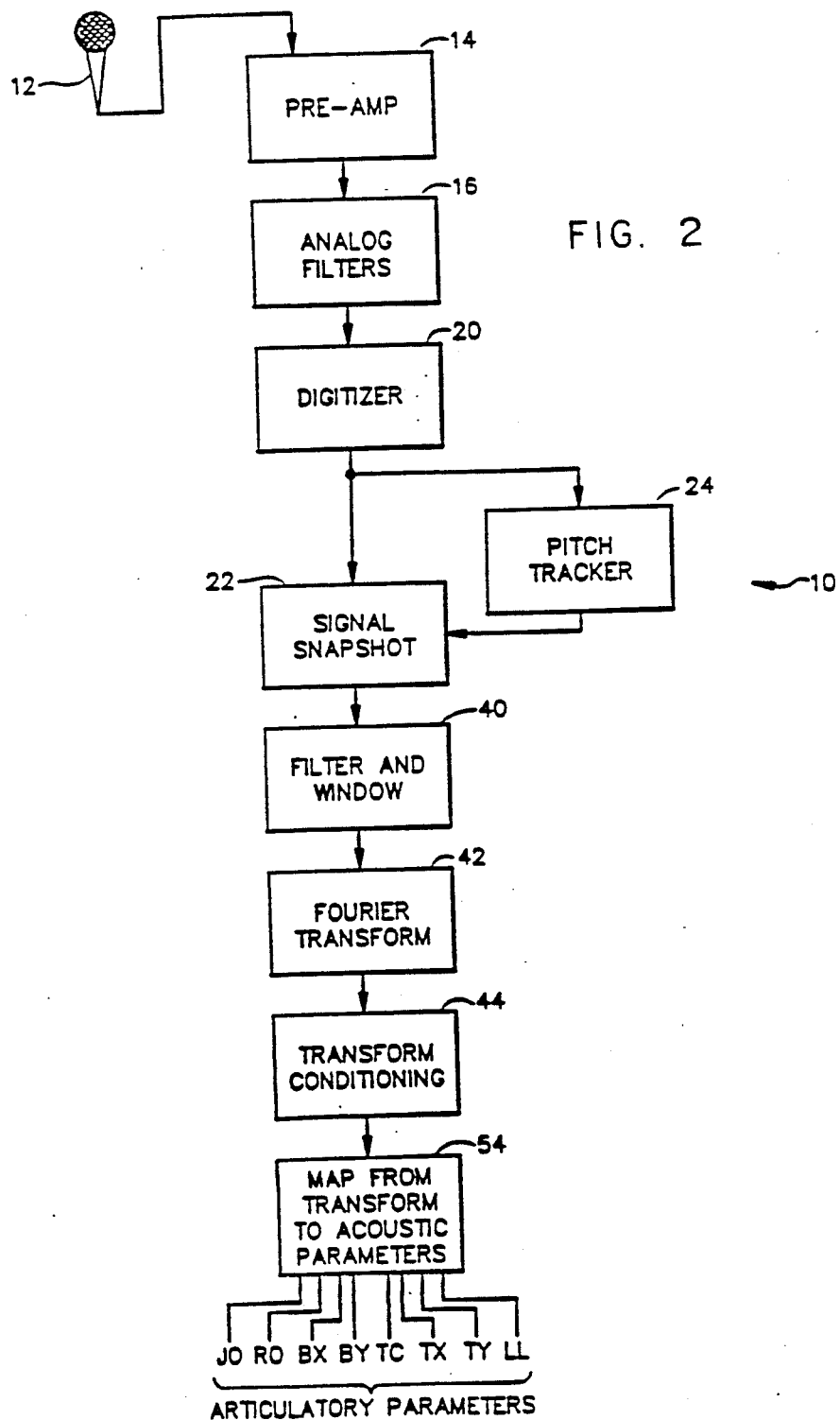
FIG. 2 illustrates a speech system for determining and displaying articulatory parameters operating according to the method of FIG. 1.

In FIG. 1, oral speech is first converted into a signal which is subsequently amplified, filtered and frequency compensated before being digitized for final processing to produce the desired output. This conversion is implemented, as shown in FIG. 2, by using a microphone 12, or similar audio signal pickup device for detecting oral speech and converting it to signal representing amplitude and frequency variations in the detected speech.

The microphone signal is subsequently processed by a pre-amplifier 14 to boost the general signal level. Alternatively, other components such as band equalizers (not shown) can be employed as desired to alter the amplitude or frequency characteristics of the input signal. Preamplifier 14 comprises one of several commercially available amplifier or pre-amplifier circuits used for increasing signal levels. An exemplary pre-amplifier 14 circuit is an amplifier produced by the Radio Shack division of the Tandy Corporation of Fort Worth, Tex. under the designation of Realistic Amplifier model number MPA-20.

Before being digitized, the output of the pre-amplifier 14 is filtered to provide high frequency boosting, remove DC bias, and minimize aliasing. Providing high-frequency boost across the sampled audio band provides a more nearly flat spectrum and compensates for the fall off of about 6 dB per octave, typically encountered in the speech spectrum. The boost results in speech formant peaks which exhibit roughly equal amplitude across the spectrum rather than falling with increasing frequency. Thus spectral peaks generated by fricatives with high frequency content will have energy comparable to the peaks produced by low frequency vowels. Therefore, less dynamic range will be required in any subsequent digitizing step to effectively capture the signal characteristics of interest.

Figure 3:
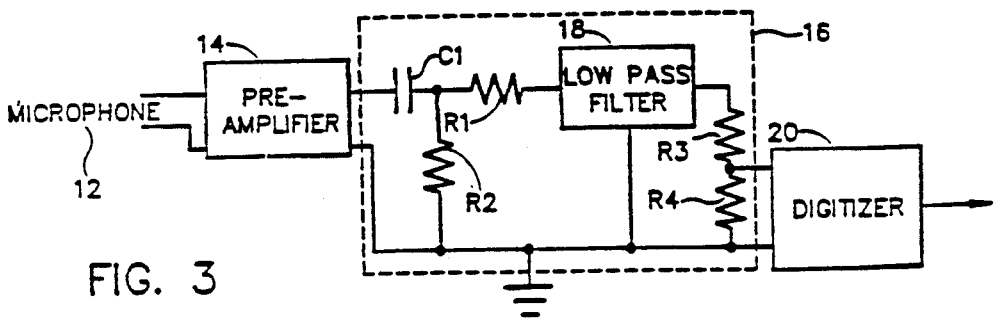
FIG. 3 illustrates a typical input stage used for digitizing and filtering speech in the system of FIG. 1.

As shown in more detail in the schematic diagram of FIG. 3, a capacitor C1 and two resistors R1 and R2 form a high frequency boost circuit as well as provide impedance matching for the following circuit elements. The capacitor C1 also provides a DC filter The filter functions to remove DC biasing which otherwise degrades FFT performance in later processing steps. The preferred boost circuit is configured to provide a high-frequency boost of approximately 6 dB per octave between about 300 and 2,000 Hz which is the primary spectral range of interest in processing speech data. An anti-aliasing filter 18 is connected in series with the boost circuitry and provides a sharp roll-off in frequency above 5 kHz. An exemplary filter 18 is a 5 kHz low-pass filter available from TTE, Inc. of Santa Monica, Calif. under the designation number TTE J71G. Two resistors, R3 and R4, provide impedance matching between the output of the anti-aliasing filter 18 and a digitizer 20. These resistors also adjust the signal input level for the digitizer 20. A digitizer 20 samples the output of the anti-aliasing filter 18 and generates a corresponding digital speech signal. The digitized signal comprises a series of multi-bit values or data words representing the relative magnitude of the speech signal at periodic sampling times. Such digitizers are known. An exemplary digitizer which has been found useful in implementing the preferred embodiment is the Audio Digitizer manufactured by Impulse, Inc. of Minneapolis, Minn.

In the preferred embodiment, the digitizer 20 is configured to sample the speech signal at an 11 Kilohertz sampling rate and generate 8 bit data values for each sample. A signal sampling rate of at least twice the highest frequency of interest is used. An 8 bit data word length is large enough to maintain significant spectral detail during digitizing and at the same time provide compatibility with a large number of existing computers for implementing the remainder of the present processing method.

From the point where the speech signal is digitized, digital computational techniques and structures implement all of the functions yet to be described. Those skilled in the art will be aware that any function of the remainder of the invention implemented in the form of a digital process, executable by a digital computer, has a corresponding analog implementation.

As shown in FIG. 1, the digitized speech signals are monitored to determine variations in energy content. This information is used to select data segments comprising a series of samples for further processing to determine articulation parameters.

As shown in FIG. 2, digital speech signals or samples are provided by the digitizer 20 to a signal snapshot element 22 which selects segments of the digitized signal for further processing. The determination as to which portion or portions of the digitized speech signal are selected for further processing is made by a pitch tracker 24. The pitch tracker detects sudden increases in high frequency energy.

Figure 4:
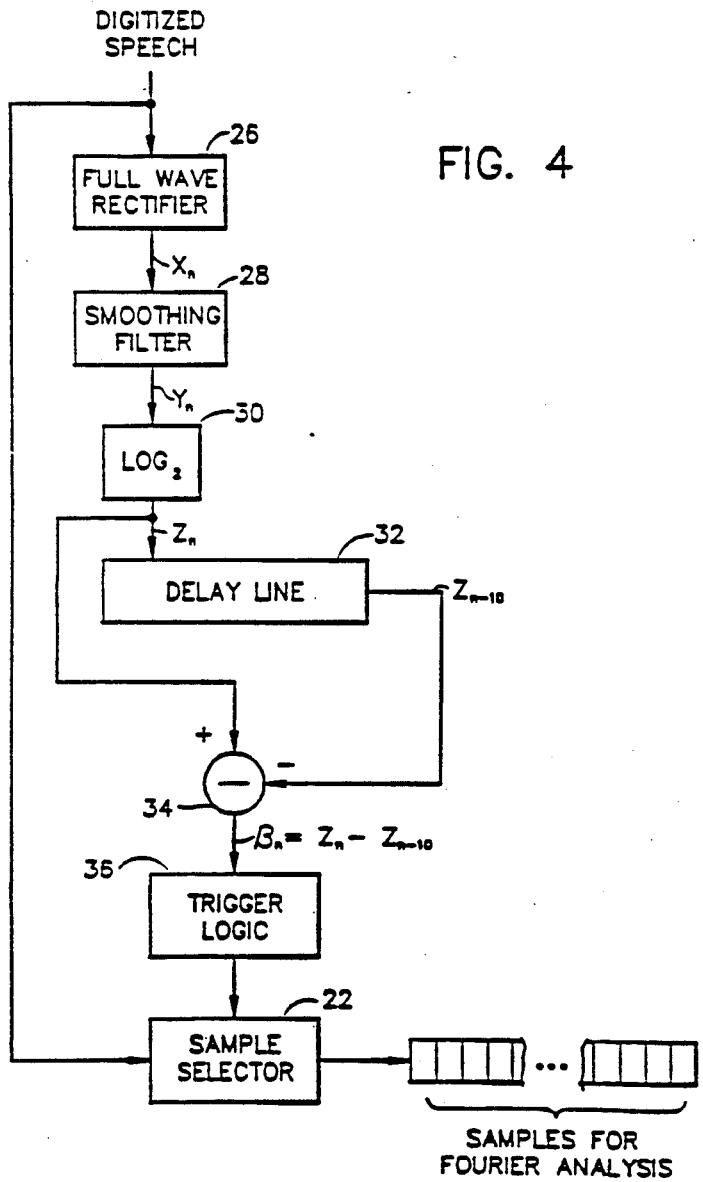
FIG. 4 presents a more detailed schematic of the pitch tracker and signal snapshot elements of FIG. 1.

The operation and structure of the pitch tracker 24 and the signal snapshot element 22 are shown in greater detail in FIG. 4. In FIG. 4, a digital signal enters the first stage of the pitch tracker 24 which comprises a full wave rectifier 26. The rectifier 26 generates an output signal which is the absolute value of the digital speech signal. The absolute value indicates changes in the relative energy of the digital signal.

The next stage of the pitch tracker 24 is a smoothing filter 28 which smoothes the output of the rectifier 26 to a single smooth pulse so as to reduce spurious oscillations or oscillating bursts of energy resulting from pitch pulses. The filter 28 chosen for the preferred embodiment operates according to a relationship defined by:

$$Y_n = (15/16)Y_{n-1} + X_n/16 \quad (Eq. 1)$$

where $Y_n$ is the output signal and $X_n$ the input signal. This relationship is found to provide very good results in smoothing formant oscillations. After the filter 28, the digital speech signal is processed by a logarithmic converter 30 which changes the linear scale of the digital signal to a logarithmic scale. Converting to a logarithmic scale allows subsequent processing to be independent of absolute signal level and allows the pitch tracker 24 to operate over a wide range of input signal levels. This is important in speech analysis where there is a significant dynamic range.

The output of the log converter 30 is used to drive a trigger logic unit 36 which is used to gate segments from the digital sample input for subsequent processing. The trigger logic unit 36 uses a difference between the log converter 30 and a second input to determine trigger status or activation. The activation of the trigger conforms to certain changes in short term energy level for the digital signal.

In the method of the present invention, wideband spectral data is being used for processing because fine spectral resolution given by long term analysis times is not needed, can often be misleading, and smoothes out short term changes that may contain significant feature information. With this in mind, it is desirable to process the digitized speech approximately 32 samples at a time which allows implementation using a very efficient and fast FFT circuit. Additional spectral detail is not needed using the method of the present invention and processing larger segments of data requires additional FFT steps with a resultant loss of speed.

The spacing between segments, or selection of each group of 32 samples, sets an outside limit for trigger timing. There is a limit to how fast the vocal tract can move so no additional information is gained by continuously selecting segments. Only the selection of one segment per pitch period is desired. Further, human pitch is unlikely to exceed 458 Hz which at the sampling rate chosen above, corresponds to a separation between pitch pulses of 24 samples. Therefore, a minimum spacing of 24 samples is established between selected segments.

At the same time, it is not desirable to sample too infrequently since relevant data may be missed. Since the lowest pitch is likely to be on the order of 49 Hz, a maximum delay of 224 samples is used. This assures that information from unvoiced sounds, for which triggering is erratic, is not discarded.

The triggering or selection decision is made on the basis that the energy in the segments must be increasing for a predetermined period. To check the desired trigger criteria, a signal from the log converter 30 is subjected to a delay circuit 32 before being subtracted in the subtraction element 34. The subtraction of a delayed signal from the converter 30 output produces a result $\beta_n$ which is indicative of the variation in energy in the digital signal over the delay period.

If $\beta_n$ is less than or equal to zero then the signal energy is dropping or constant over this sample period. In this situation no new samples are desired and the trigger logic does not generate a trigger output until 224 sample time periods have passed since a previous segment selection. However, if is greater than zero then the energy level is increasing and additional segment selection and trigger criteria are used.

In the present invention, a segment is not selected unless the energy level has been rising for at least 4 sample periods. As long as the energy does not rise for more than three sample periods segments are not selected until the 224 sample period is reached. This condition exists where the signal energy is still rising or is not indicative of a true pitch period.

If the energy level has risen for exactly four sample periods, then segments are not selected unless it has been at least 24 sample periods since the last selection. It is undesirable, as previously discussed, to trigger too soon. The preferred embodiment of the trigger logic is illustrated by the digital process illustrated in the following pseudo code listing:

TABLE 1

| 111 | If $\beta n \leq 0$ / * energy not rising * / |
|---|---|
| 112 | then |
| 113 | rise_time = 0 |
| 114 | time_since_trigger = time_since_trigger + 1 |
| 115 | If $\beta n > 0$ / * energy rising * / |
| 116 | then |
| 117 | rise_time = rise_time + / |
| 118 | If rise_time > 4 |
| 119 | or (rise_time = 4 AND time_since_trigger < 24) |
| 120 | or (rise_time < 4 AND time_since_trigger < 224) |
| 121 | then |
| 122 | time_since_trigger = time_since_trigger + 1 |
| 123 | / * energy continues to rise after trigger is trying * / |
| 124 | / * to trigger too soon, or is starting to rise * / |
| 125 | else |
| 126 | time_since_trigger = 0 |
| 127 | TRIGGER |

In Table I, $\beta_n = Z_n - Z_{n-10}$, since Z indicates the energy level of the speech signal, $\beta_n$ measures energy difference over 10 samples ($Z_n - Z_{n-10}$). If the speech signal is digitized at a digitizing rate of 11 KHz, 10 samples is, approximately, 0.91 milliseconds. In code line 119, the delay of 24 samples represents a pitch of 458 Hz, well above the pitch range of most children. In line 120, the 224 sample delay represents a pitch of 49 Hz, which is below the expected lowest pitch frequency uttered by an adult male.

Once the trigger logic 36 determines that a segment is to be selected, a pulse is provided to a sample selector 38 and a segment of 32 samples is passed to the next stage of processing.

Returning now to FIG. 1, we see that the selected digital samples are next processed in a filter and windowing step to prepare them for a subsequent FFT processing step. As shown in FIG. 2, this is implemented in a preferred embodiment by transferring digital speech samples through a filter and window circuit 40, which is shown in more detail in FIG. 5. This is followed by some post transformation signal conditioning in the conditioning circuit 44, also shown in more detail in FIG. 5.

Figure 5:
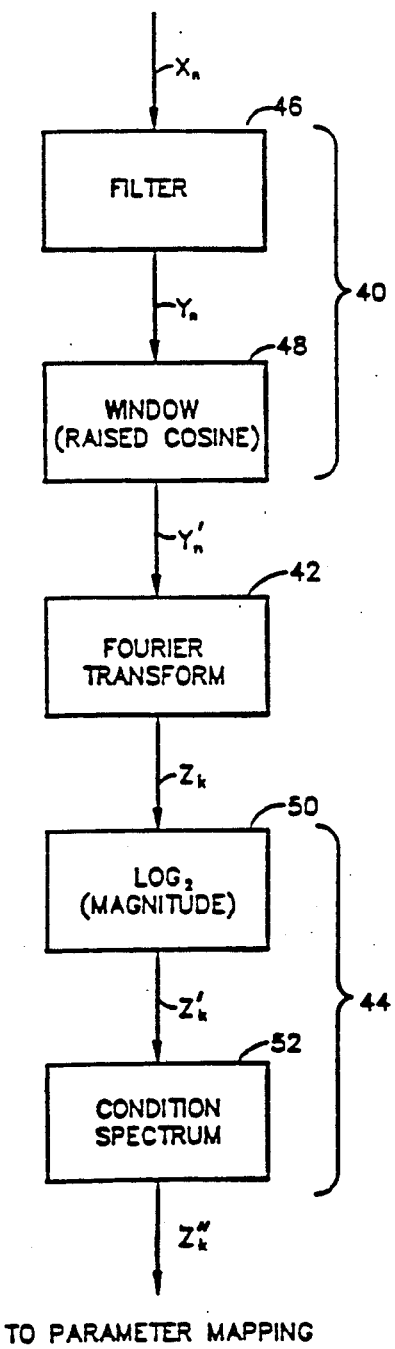
FIG. 5 shows a more detailed view of the signal filtering, window, Fourier Transform, and conditioning elements and steps employed in the apparatus of FIG. 1.

As shown in FIG. 5, the data samples are processed by a filter 46 which provides a high frequency boost transfer function. This ensures that the FFT processing, which is done with limited precision arithmetic, will not lose high frequency information in quantization noise. The preferred filter function employed is defined by:

$$Y_n = X_n - \alpha X_{n-1} \quad \text{(Eq. 2)}$$

where Y is an output signal, X is an input signal, and, typically, $0.5 \alpha 0.7$.

The technique of windowing is well known in the arts of signal and speech processing. There are a variety of window "functions" that are multiplied times the signal sample values to establish a desired window. A general discourse on their properties is found in an article entitled "On the Use of Windows for Harmonic Analysis with the Discrete Fourier Transform" by Frederick J. Harris, PROC. IEEE, Vol. 66, No. 1, January 1978.

However, some window functions such as a strict "rectangular" window create unwanted perturbations in the spectrum during the windowing process. Therefore, to eliminate such problems, a raised cosine window function is used in the preferred embodiment. The preferred windowing function is defined by the relationship:

$$W_n = 0.5 - 0.49 \cos(\pi/16)n, \text{ for } n = 0 \ldots 31 \quad \text{(Eq. 3)}$$

At this point the resultant digital data samples are processed by a 32 Point Fourier Transformation algorithm in a Fourier Transformation processing element 42. An exemplary algorithm is:

$$Z_k = \sum_{n=0}^{31} Y_n' e^{-j(2\pi/32)nk}, \text{ for } k = 0 \ldots 15 \quad \text{(Eq. 4a)}$$

where $\{Z_k\}$ is the output signal and $\{Y_n'\}$ is the input signal, and:

$$Y_n' = Y_n * W_n, \text{ for } n = 0 \ldots 31 \quad \text{(Eq. 4b)}$$

This algorithm has been found to be very useful for implementation of high speed processing in real time. In the preferred embodiment, an equivalent fast fourier transform (FFT) algorithm is used to accomplish the result of equation (4a). The FFT algorithm can operate on the digital data samples as a program routine where the samples are transferred into a computer for analysis.

The FFT processing element 42 of the preferred embodiment is configured to provide spectral data segments in the form of a spectral vector, $Z_k$, for each data segment input. That is, each time varying input signal is converted into an array of values which represent the relative frequency composition of the input signal across predetermined frequency ranges. In the preferred embodiment, the FFT element 42 produces a spectral vector $\{Z_k\}$ having 16 values each of which represents a specific frequency range, with vector indices of 0 to 15. For example the values of vector $\{Z_k\}$ in the first range or index location, 0, represent frequency compositions for the input signal between 0 and about 345 Hertz whereas spectral indices 2 through 4 represent frequencies of about 687 to 1375 Hertz.

As seen in FIG. 1, the output from the FFT element 42 is conditioned before final processing to account for processing variations and noise. This is accomplished in the apparatus of FIG. 2, by transferring the output, $\{Z_k\}$, of the FFT element 42 to a transform conditioning element 44 which is shown in further detail in FIG. 5.

In FIG. 5, the FFT element output $\{Z_k\}$ is transferred into a log converter 50. It has been found that human speech is interpreted in a non-linear fashion by the human mind and that a logarithmic scale more accurately reflects the relationship between any given sound spectrum and its mental interpretation. Therefore, the present method was developed using a logarithmic relationship in order to more accurately reflect and determine proper weighting and interpretation of sounds.

The Fast Fourier Transformation process for 32 samples of real data generates 16 complex samples. Therefore, the log converter 50 is configured to generate the log of the magnitude of the FFT output $\{Z_k\}$ or:

$$Z'_k = \log_2[\text{mag}(Z_k)] \quad \text{(Eq. 5)}$$

It is assumed, in the practice of the invention, that, in any electronic or digital processing technique, there exist signals that are below the discrimination and general noise level of conversion or processing and detection circuitry. It is also assumed that, owing to the nature of later processing steps, many signals below a certain predefined level will not provide accurate or useful information for the processing. That is, the limited amount of useful information in these signals gives rise to ambiguities and uncertainties that make further processing undesirable. Therefore, spectral signals below these predefined levels are discarded using a threshold comparator.

The art of speech processing has assumed that the threshold for signal noise is very low and processing should incorporate as much of the signal as possible. Where there are errors or ambiguities, it has generally been assumed that more information needs to be collected from a speech signal to complete or improve processing. It is an advantage of the present invention that these assumptions regarding speech processing are not employed.

Instead, it has been found through the diligent efforts of the invention that the speech determination or interpretation system of the human mind does not and cannot assimilate all of the data present in audio signals. That is, the entire audio signal is not used to interpret speech. From this it can be seen that in any electronic processing of the signal a higher threshold can be used to discard material that is really extremely difficult and impossible to accurately interpret. By setting a higher noise threshold no useful information is lost if the electronic system is operating under proper constructs. At the same time, ambiguous or incomplete information (data) is removed which actually improves the overall performance.

Returning to FIG. 5, a signal spectrum conditioner 52 processes the log converter output signal $\{Z'_k\}$ to establish a minimum signal level useful for the method and apparatus of the present invention. An exemplary threshold or discrimination relationship employed by the conditioner 52 is:

$$Z''_k = Z'_k - (\max\{Z'_k\} - N), \text{ for } k = 0 \ldots 15 \quad \text{(Eq. 6)}$$

where $\{Z''_k\}$ is an output signal, $\{Z'_k\}$ is an input signal, $\max\{Z'_k\}$ maximum value obtained by the signal $\{Z'_k\}$, and N is determined by the amount in decibels to be retained.

Typically N is chosen to retain between about 15 to 20 dB. Those skilled in the art are familiar with circuits or devices used to establish such a threshold relationship in digital signals. As before, this relationship can also be accomplished using software where the signal is transferred into a digital computer.

Returning now to FIG. 1, the conditioned samples $\{Z''_k\}$ are now mapped from transformed spectral data into a series of predefined acoustic or articulatory parameters. As shown in FIG. 2, this is accomplished using a mapping element 54 which provides a series of articulatory parameter values for each discrete spectral sample input An exemplary apparatus for constructing the mapping element 54 is shown in greater schematic detail in FIG. 6.

In order to implement the method and apparatus of the present invention and map spectral data into articulatory parameters, the parameters to be detected and the method by which they are associated with spectral patterns are first established.

The method of the present invention employs commonly accepted linguistic units known as "phonemes" to segment speech data or spectra into discrete classes of similar spectra which can be appropriately related to a specific set of articulation parameters. The invention is based upon the identification of approximately 24 basic phonemes which occur in spoken data. It is actually the spectra which characterize these 24 phonemes that are observed, but the phonemes are useful as associative labels or markers for the related spectra.

The phonemes used in formulating the mapping process are listed below in Table II, along with an arbitrary numerical assignment and a categorization as to type. It should be noted that only continuants, as opposed to transitory events such as stops, etc., are present in Table II. As is known, continuants exhibit spectral stability over many milliseconds, which provides ample opportunity to sample them. In Table II, no distinction is made between voiced and unvoiced fricatives since vocal tract shapes which produce them are essentially equivalent.

The continuants listed in Table II are set out in four primary classes: vowels, fricatives, liquids, and nasals. Also, glides and some special phonemes are allocated processing definitions where desired. It is noted that the present invention does not limit analysis and processing exclusively to the list of Table II. Other phonemes can be used to account for particular articulatory patterns that arise frequently in certain types of speech or speech therapy. In addition, the entire list need not be used, although important articulation information will otherwise be lost to the user. Those skilled in the art will realize that the classes established by Table II are language dependent.

TABLE II

| Vowels | | | | | |
|---|---|---|---|---|---|
| | as in | | as in | | as in |
| 1 - /i/ | (beet) | 5 - /A/ | (bat) | 9 - /U/ | (book) |
| 2 - /I/ | (bit) | 6 - /a/ | (bottle) | 10 - /u/ | (boot) |
| 3 - /e/ | (bait) | 7 - /O/ | (caught) | 11 - /&/ | (but) |
| 4 - /E/ | (bet) | 8 - /o/ | (boat) | 12 - /r/ | (bird) |

| Liquids | | | |
|---|---|---|---|
| | as in | | as in |
| 13 - /R/ | (road) | 14 - /L/ | (little) |

| Fricatives | | | |
|---|---|---|---|
| | as in | | as in |
| 15 - /s/ | (sing, zing) | 18 - /T/ | (Thought, this) |
| 16 - /S/ | (shove, measure) | 19 - /h/ | (he) |
| 17 - /f/ | (file, very) | | |

| Nasals | | | |
|---|---|---|---|
| | as in | | as in |
| 20 - /m/ | (mom) | 22 - /N/ | (sing) |
| 21 - /n/ | (no) | | |

| Glides | | | |
|---|---|---|---|
| | as in | | as in |
| 23 - /y/ | (yet) | 24 - /w/ | (wet, when) |

For purposes of illustration and implementing a preferred embodiment, a series of eight articulation parameters were chosen for correlation with the phonemes listed in Table II. The parameters used in the invention to describe the anatomical characteristics of the human vocal tract are:

Jaw Opening (JO)

Lip ROunding (RO)
Tongue Center height (TC)
Tongue Back horizontal position (BX)
Tongue Back vertical position (BY)
Tongue Tip horizontal position (TX)
Tongue Tip vertical position (TY)
Lower Lip retraction (LL)

The title or designations for each of these parameters refer to the anatomical location or element whose position is described by that parameter and are easily understood by those skilled in the art. The last parameter, LL is used to describe the lower lip offset from the value specified by Lip ROunding parameter which is needed for forming phonemes such as /f/ and /v/.

Those skilled in the art will readily appreciate that additional parameters, or alternate forms of designation, can be assigned and correlated with the articulation of the phonemes listed above. An example would be a parameter to track tongue flattening or tension. However, using additional parameters also requires additional processing power and time which are tradeoff considerations for specific applications.

The definitions or physical attributes for the above parameters are determined by a careful analysis of information available in research publications, x-rays of vocal tracts in operation, information from speech therapists, and data samples taken in laboratory measurements.

Laboratory measurements can include spectral data accrued over time by tracking known phonemes. That is, well-identified phonemes are monitored from known speech sources and their spectra segregated to allow correlation of the spectra with each associated phoneme. The spectral data must be accumulated from a significant number of subjects and a variety of speech types (male, female, female child, male child), to provide a significantly speaker-independent system.

The above information provides a data base of known anatomical motion or muscle positions used to create sound for forming specific phones or phonemes. This in turn defines the position of various articulatory tract or anatomical features and, therefore, the values for the articulatory parameters. That is, by reviewing the above data or information, specific values for the relative position of a speaker's jaw, tongue tip, tongue center, tongue back, etc., are established for specific sounds or phonemes being formed. This means that a given anatomical configuration is established for each phoneme in the above table.

The articulatory parameters are expressed in terms of position along a parameter axis which represents the movement with respect to a pre-selected base or origin (0,0) value. The actual coordinate values or base-coordinate positions used in defining parameters are chosen to simplify computations and satisfy known physical limitations. For example, the tongue tip cannot move higher than the roof of the mouth, but the teeth can close farther together than where they first touch since they can rest in an overlapping position. The indexes for the articulation parameters are set to prevent physical improbabilities and to use a relative scale commensurate with the resolution of any associated display systems, as discussed below. Those skilled in the art will readily understand the process by which selection of base-coordinates and scale are made and will adjust these values to fit particular applications.

Using these known anatomical configurations or patterns, each phoneme ph(n) from the list of 24 preferred phonemes is assigned a representative feature vector, f(n,p), having as its elements eight specific articulatory parameter (p). The feature vector f(n,p) for a specific value of n is a 1 by 8 vector containing individual elements for each of the articulatory parameters listed above, which can be conveniently expressed as:

f(n,p)=[JO(n), RO(n), TC(n), BX(n), BY(n), TX(n), TY(n), LL(n)]

However, those skilled in the art will understand that alternate parameter sequences are possible within the teachings of the present invention.

The next step is to define the relationship for mapping measured spectra into the designated feature vectors. This is made possible by recognizing that each phoneme has one or more spectral patterns associated with it which can be treated as a substantial indicator or signature for it. Therefore, the spectra or spectral distribution of speech data can be directly mapped onto, or correlated with, articulatory parameters through use of the phonemes to which corresponding parameters are assigned. The method of the present invention employs a feature map for mapping spectral data into the articulatory parameters. Using this feature map allows the spectrum information provided by the FFT element 42 to be interpreted to determine its articulatory parameter composition. This is done by generating linear transformation matrixes for classes of phonemes. These class matrixes are multiplied by the FFT output spectral data to generate a reasonable approximation of the feature vector corresponding to the sound producing the spectrum. The matrixes are developed using principles of matrix derivation, multiplication, and transposition understood in the mathematical arts. To date, speech processing has not used this technique before to provide a spectral mapping of wideband spectral information into spectral or phoneme classes. The following derivation explains the steps which must be taken to build a set of mapping modalities (matrixes) necessary to understanding and using the invention. This is done once in the laboratory, rather in real time during the practice of the invention.

The preferred phonemes are first grouped together into classes according to spectral and articulatory similarity. An exemplary grouping of phonemes into classes, based on spectral and articulatory similarities for the phonemes discussed above is:

| Class 0 | sSTfh  | fricatives    |
|---------|--------|---------------|
| Class 1 | iIeEA  | front vowels  |
| Class 2 | AaO&ho | low vowels    |
| Class 3 | oUuw   | back vowels   |
| Class 4 | Rr     | R's           |
| Class 5 | Ln     | L and nasals  |

It should be noted that phonemes such as /h/, /o/ and /A/ each appear in two classes. This is because these are "border line" cases and the classes can overlap.

Using the above Class grouping, the linear transformation matrixes can be derived as follows:

For a given class C there is a set of phoneme feature vectors:

f(n,p) : for p=0 . . . 7 and n in Class C and a set of measured spectra:

s(j,n,i) : for ]j=0 ... 15, n in Class C, and i=0 ... M(n)−1 where M(n) is the number of spectra representing class C.

A linear transformation matrix T, and a constant vector, c, is required for transforming the measured spectrum s(j,n,i) into feature vectors. In this regard, when T is multiplied times an observed spectrum, s, and added to c, a reasonable approximation of the feature vector f(n) that corresponds to the sound made in producing s is generated. That is, for the spectrum s, representing phoneme n, the expression:

$$T*s(n)+c=f(n) \quad \text{(Eq. 7)}$$

produces a close fit to the f(n) feature vector for the phoneme ph(n).

Each row of the matrix T is independent of the others which allows each element of the feature vector (such as each parameter p) to be considered separately. Therefore, for a given parameter p we have values of f(n) for each n in C and a set of spectra s(j,n,i). What is needed is a 16 value vector t(j), where j=0 ... 15, that is one column of the transformation matrix T, such that:

$$t*s(n,i)+c \approx f(n) \quad \text{(Eq. 8)}$$

for i=0 ... M(n)−1 and all n in C, with the 16 values corresponding to the spectral divisions or ranges provided by the FFT processing.

The first element s(0,n,i) is almost always nearly zero due to the removal of DC bias before FFT processing. The value s(0,n,i) is deleted because it essentially represents noise or energy at 0 Hertz. Therefore, the element s(0,n,i) is replaced by a constant (e.g. 1), which has the effect of replacing the first element in the vector t(j) with the constant c, and equation(s) becomes, more simply:

$$t*s(n,i) \approx f(n) \quad \text{(Eq. 9)}$$

for i=0 ... M(n)−1, all n in C.

Rigorously, there is a vector t that minimizes the mean square error (EC) between t*S(N,i) and f(n):

$$EC = \sum_{n \text{ in } C} \sum_{i=0}^{M(n)-1} [t*s(n,i) - f(n)]^2 \quad \text{(Eq. 10)}$$

$$EC = \sum_{n \text{ in } C} \sum_{i=0}^{M(n)-1} \left\{ \left[ \sum_{j=0}^{15} t(j)s(j,n,i) \right] - f(n) \right\}^2 \quad \text{(Eq. 11)}$$

which becomes:

$$EC = \sum_n \sum_i \left[ \sum_{j=0}^{15} \sum_{k=0}^{15} A(j,k) - 2f(n)\left[\sum_{j=0}^{15} B(j)\right] + f(n)^2 \right] \quad \text{(Eq. 12)}$$

where:

$$A(j,k) = t(j)s(j,n,i)t(k)s(k,n,i)$$

$$B(j) = t(j)s(j,n,i)$$

Standard calculus suggests that EC is a minimum when the partial derivative of EC with respect to each t(j) is zero. Performing the partial derivation and solving for t(j) yields:

$$t(j) = \sum_{m=0}^{15} S^{-1}(m,j)F(m,p) \quad \text{(Eq. 20)}$$

where $S^{-1}$ is the inverse of a symmetric matrix S and where S and F are computed from the spectral data s(j,n,i) and the desired feature vectors f(n,p) as follows:

$$S(m,j) = \sum_{n \text{ in } C} \sum_{i=0}^{M(n)-1} s(j,n,i)s(m,n,i) \quad \text{(Eq. 21)}$$

$$F(m,p) = \sum_{n \text{ in } C} \sum_{i=0}^{M(n)-1} f(n,p)s(m,n,i) \quad \text{(Eq. 22)}$$

The equation to be solved for the transform matrix T(j,p) is P, then:

$$F(m,p) = \sum_{i=0}^{15} S(m,j)T(j,p) \quad \text{(Eq. 23)}$$

For a given set of phonemes, definition of phoneme classes, and set of spectral data {s(j,n,i)}, the process of the above equations results in a transform matrix, T, for each class of phonemes. The error, EC, defined above, provides a measure of the accuracy of T in mapping spectra of the class it defines to feature vectors in the class.

The next step is to derive a linear transform that reliably and accurately separates the classes. This transform comprises a class distinction or splitting matrix that is derived using the same method as before except that a class vector is employed instead of the feature vector. Here all vector elements except that representing the specific class the phoneme belongs in are zero.

As in the case of the separate class matrixes, the error measure, EC, for this class distinction transform matrix is inspected. If EC is too large for the class matrix then one or more classes include too many dissimilar phonemes and they are broken down to smaller or differing groupings. Therefore, after a few iterations of verifying the error measure for these two sets of transforms, the process is balanced and the appropriate matrixes are available.

Figure 6:
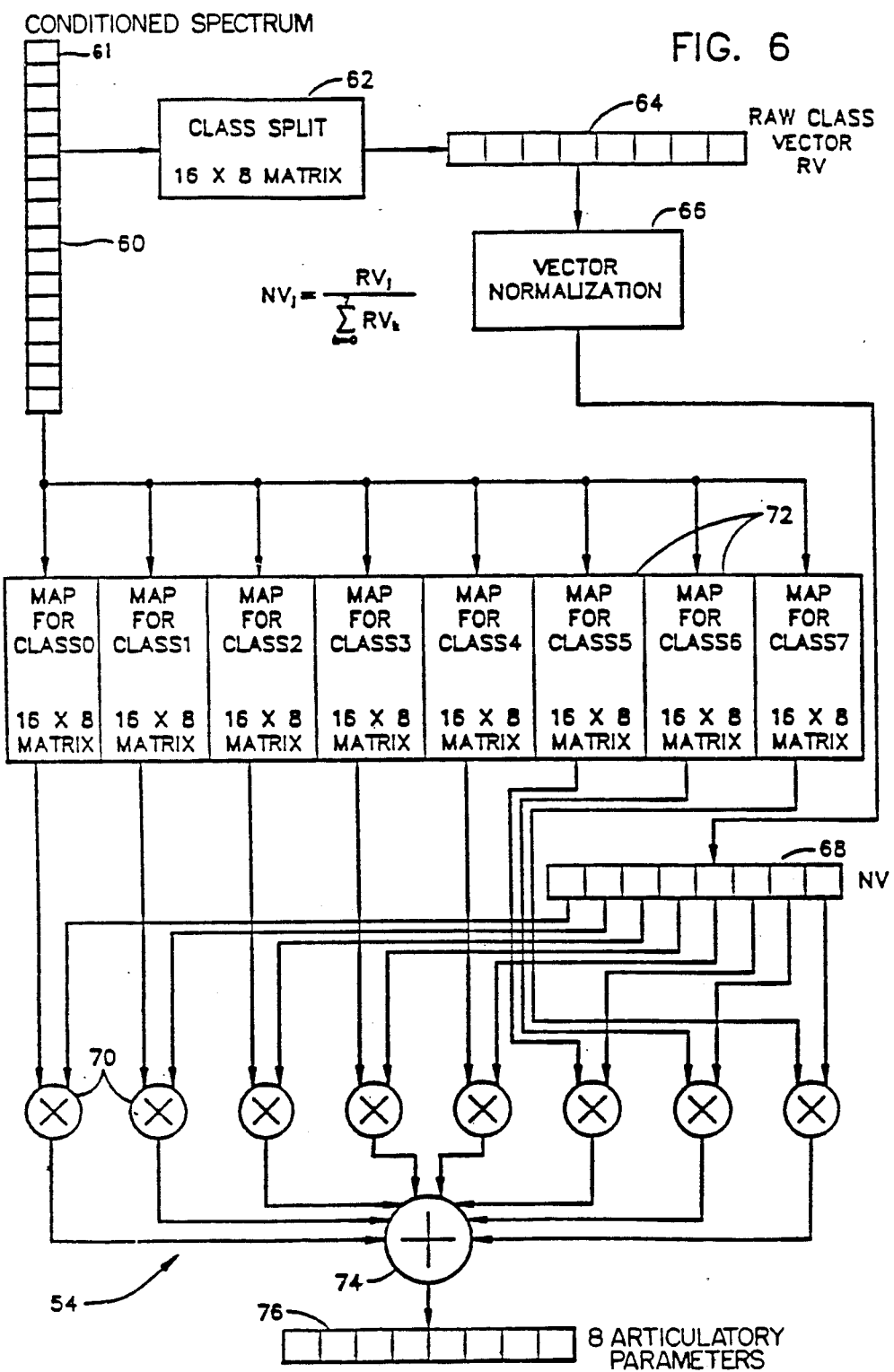
FIG. 6 illustrates a schematic of the mapping elements for articulatory parameters employed in the apparatus of FIG. 1 and class selection and parameter determination steps.

Turning now to FIG. 6, a spectral sample 60 comprises a vector of spectral information. In the preferred embodiment, the sample 60 has 16 elements 61, each corresponding to a portion of the spectral range of interest. Each element includes a multi-bit word corresponding to the magnitude of energy exhibited by the sample in the corresponding spectral portion.

In processing, the sample vector 60 is multiplied by a class distinction or separation matrix 62 and by a series of class matrixes 72. The values of the elements forming the class distinction matrix 62 generate a correspondence to the probability that a spectral sample (represented by the sample vector 60) falls within a given class of sounds or phonemes. This matrix multiplication generates a single vectorial output of 1 by 8 elements, each element representing a relative weight value that a speech segment falls in a particular one of eight spectral classes. The output is in the form of a single raw class vector 64.

The raw class vector 64 is then normalized in a normalization element 66 according to the relationship:

$$NV_j = RV_j / \sum_{k=0}^{7} RV_k \qquad \text{(Eq. 35)}$$

to generate a normalized probability class vector 68 which comprises values representing the probability that a segment falls within a given class. The vector 68 has each of its constituent values transferred to a multiplier or transfer means 70 which transfers the vectors resulting from the separate class multiplications of the vector 60 into a summation element 74 for generating a single feature vector 76.

The matrixes 72 represent the class matrixes discussed above, there being one for each predefined class of spectra or phonemes. The element values in these matrixes, when multiplied by the sample vector 60, produce an 8 parameter feature vector. Thus, eight feature vectors result from multiplication of the parallel class matrixes 72 by the sample vector 60.

By multiplying each feature vector output from the class matrixes 72 by a corresponding element in the normalized class vector 68, a weighted vector for each class of phonemes is obtained for each sample vector. That is, the class distinction matrix determines the weighted probability that a sound is part of any one class and selects a percent of the output from each class based on that weight. If a sound falls solely in one phoneme class, then the weighted value for that class will be about 1.0, while values for all other classes will be approximately zero. This results in selection of the output from only one class matrix 72.

However, it is possible that a sound will fall in more than one class. This will occur, for example, when speech transitions between phonemes. In this case the class probability vector 68 selects those classes the sound falls within and does so according to the probability values. The class outputs are then summed to provide a single feature vector.

Figure 7:
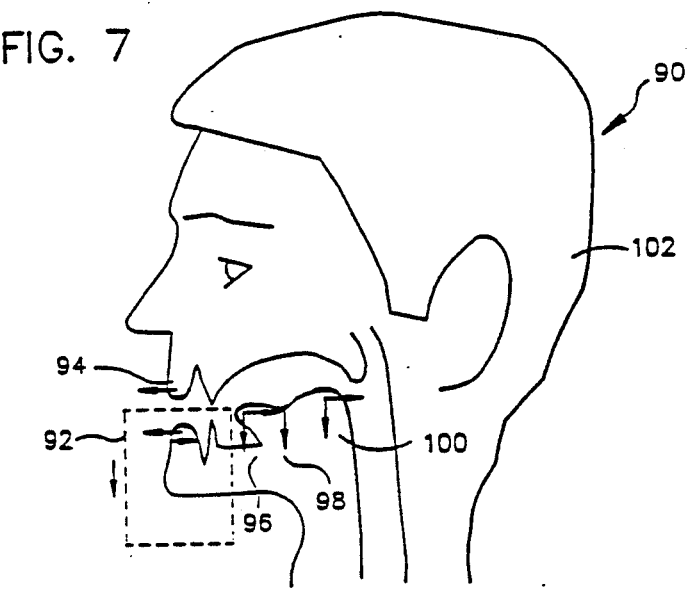
FIG. 7 illustrates a display for the selected articulation parameters.

To make the apparatus of the present invention more useful, although not required, a display is provided for visually inspecting the values of the articulatory parameters of the feature vector 76 during speech processing. An exemplary display pattern for presenting the parameter data is shown in FIG. 7 where a mid-sagittal view of the articulatory tract is displayed. The parameters of interest are clearly marked in FIG. 7, although in a final display system they would generally not be shown by other than movement. As speech samples are processed, each parameter is varied accordingly, and the display device told to alter the visual pattern on the screen.

One application for this system is for use in speech therapy. A speech therapy system operating according to the principles of the present invention is shown in FIG. 8.

Figure 8:
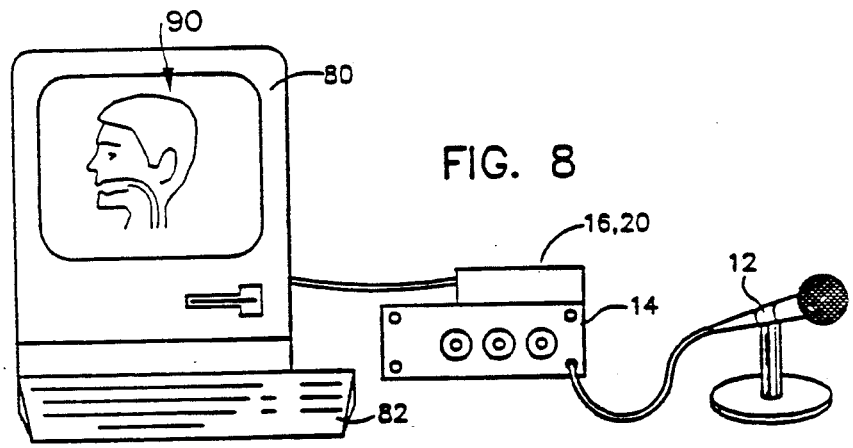
FIG. 8 illustrates a speech therapy system employing the present invention.

In FIG. 8, the speech therapy system 90 allows individuals to determine the status of the aforedescribed articulatory parameters and observe a graphical representation of those parameters on a display device. This allows the user to better understand the physical interactions of their vocal system and how conscious muscular changes impact speech. The present system has the advantage that a system user can see changes in the anatomical structure when they make changes. The displayed image is dynamic, as opposed to static, allowing immediate feedback and improved information relating to anatomical control over speech features. Therefore, the present invention supports an improved understanding of the articulation process.

This is accomplished by using a microphone 12 or similar device as previously discussed to receive speech from the therapy subject. The speech is processed by analog filtering where desired and digitized. The digitized signal is coupled into a microcomputer for further processing as previously described.

The therapy system employs a microphone 12 as an input source for the amplifier 14 and the subsequent filter and digitizer stages. The digitized speech signal is then transferred into a microcomputer 80 where it is processed according to the method of the present invention using computer program instructions to provide the necessary filter, window, FFT and transformation steps for the input data. The parameters resulting from this process are then provided to the program that is used to drive the video display.

Video display technology is well understood in the computer arts and details of graphical displays are not reiterated here. However, the mid-sagittal view of the image 90 very clearly imparts the desired parameter information and is considered a very desirable image to use in conjunction with the present invention. The various features of that image have been designed to provide a realistic, although, cryptic representation of actual articulation changes for users.

The speech therapy system 90 offers improved correlation of the articulatory parameters or anatomical changes required to generate a particular sound when it is synchronized with the real time input from a system user. In addition, split screen display of information can be employed so that an idealized model for forming a series of sounds is displayed adjacent to the real time display resulting from the system user's current input.

EXEMPLARY MATRIXES

Exemplary splitting and class matrixes (62 and 72, respectively, in FIG. 6) for mapping input spectra into spectral classes and class articulatory parameters are presented below. The matrixes are presented in their transposed forms for simplicity in illustration only. These matrixes are derived according to the mathematical analysis described above and using spectral classes based on the following phonemic classes:

| Class 0 | sSTfh  | fricatives    |
| Class 1 | iIeEA  | front vowels  |
| Class 2 | AaO&ho | low vowels    |
| Class 3 | oUuw   | back vowels   |
| Class 4 | Rr     | R's           |
| Class 5 | Ln     | L and nasals  |

This leads to the following matrixes:

| SW | CL0   | CL1   | CL2   | CL3  | CL4   | CL5   | CL6 | CL7 |
|----|-------|-------|-------|------|-------|-------|-----|-----|
| 0  | 0.16  | 0.03  | 0.06  | 0.09 | 0.16  | 0     | 0   | 0   |
| 1  | −0.03 | 0     | −0.16 | 0.06 | 0.09  | 0.03  | 0   | 0   |
| 2  | −0.13 | 0.06  | 0.09  | 0.06 | −0.16 | 0.06  | 0   | 0   |
| 3  | 0     | −0.03 | 0.03  | 0    | 0.06  | −0.03 | 0   | 0   |
| 4  | 0     | −0.06 | 0.09  | −0.06| 0     | 0     | 0   | 0   |
| 5  | 0     | 0     | 0     | 0    | 0.06  | −0.03 | 0   | 0   |

-continued

| SW | CL0 | CL1 | CL2 | CL3 | CL4 | CL5 | CL6 | CL7 |
|---|---|---|---|---|---|---|---|---|
| 6 | 0 | 0.06 | −0.03 | −0.06 | 0.03 | 0 | 0 | 0 |
| 7 | 0 | 0.06 | 0.03 | 0 | −0.03 | −0.09 | 0 | 0 |
| 8 | 0 | 0.06 | 0 | 0.06 | −0.09 | −0.03 | 0 | 0 |
| 9 | 0 | 0.06 | 0 | −0.16 | 0 | 0.06 | 0 | 0 |
| 10 | 0.03 | 0 | 0 | 0.03 | −0.03 | 0 | 0 | 0 |
| 11 | 0.06 | −0.09 | 0 | 0 | −0.03 | 0.03 | 0 | 0 |
| 12 | −0.06 | 0.09 | 0 | −0.09 | 0 | 0.06 | 0 | 0 |
| 13 | 0.06 | 0 | 0 | 0.03 | −0.09 | 0 | 0 | 0 |
| 14 | 0.03 | −0.03 | 0 | 0 | 0.03 | −0.03 | 0 | 0 |
| 15 | 0.22 | −0.13 | 0 | 0 | −0.03 | 0.03 | 0 | 0 |

Where CLn represents the Class n and SW represents the spectral weight for a given one of 16 spectral ranges provided in the fourier-transformed data.

Class 0 Matrix: sSTfh (fricatives)

| SW | JO | LR | TC | TBx | TBy | TTx | TTy | LL |
|---|---|---|---|---|---|---|---|---|
| 0 | −0.31 | 0.22 | 1.09 | −0.22 | 0.97 | 0.66 | −0.25 | 0.16 |
| 1 | −0.16 | 0 | 0.03 | −0.13 | −0.03 | −0.03 | 0.06 | 0.22 |
| 2 | 0.06 | 0.09 | 0 | 0 | 0.09 | 0.06 | 0.09 | 0.03 |
| 3 | 0 | −0.03 | 0 | 0 | 0 | −0.09 | −0.09 | −0.06 |
| 4 | 0.25 | −0.06 | 0.44 | 0.06 | 0.19 | −0.03 | 0.72 | 0 |
| 5 | −0.09 | −0.06 | −0.03 | −0.03 | −0.09 | −0.13 | −0.22 | 0 |
| 6 | 0.22 | −0.03 | 0.34 | 0.03 | 0.19 | −0.13 | 0.53 | 0 |
| 7 | 0 | −0.03 | 0.03 | −0.03 | 0 | −0.22 | −0.06 | 0 |
| 8 | 0.13 | 0.06 | 0.03 | 0.03 | 0.09 | 0.16 | 0.25 | 0 |
| 9 | −0.03 | 0 | −0.03 | 0 | −0.03 | −0.09 | −0.16 | 0 |
| 10 | 0 | 0.06 | −0.22 | 0.06 | −0.03 | 0.19 | −0.25 | −0.09 |
| 11 | 0 | 0 | 0.03 | 0 | 0 | 0 | 0.06 | 0 |
| 12 | −0.06 | 0 | −0.13 | 0 | −0.06 | 0 | −0.25 | −0.03 |
| 13 | 0.03 | 0 | 0.03 | 0 | 0.03 | −0.16 | 0 | 0 |
| 14 | 0 | −0.03 | 0.03 | 0.03 | −0.03 | 0.03 | 0.03 | −0.03 |
| 15 | 0 | −0.06 | 0.13 | −0.09 | 0.03 | −0.37 | 0.00 | 0.06 |

Class 1 Matrix: iIeEA (front vowels)

| SW | JO | LR | TC | TBx | TBy | TTx | TTy | LL |
|---|---|---|---|---|---|---|---|---|
| 0 | 0.16 | 0 | 0.72 | −1.72 | 0.28 | −0.37 | 1.00 | 0 |
| 1 | −0.28 | 0 | −0.62 | −0.28 | −0.56 | 0 | −0.28 | 0 |
| 2 | 0.13 | 0 | .31 | 0.16 | 0.28 | 0 | 0.13 | 0 |
| 3 | 0.19 | 0 | .44 | 0.19 | 0.37 | 0 | 0.19 | 0 |
| 4 | 0.13 | 0 | .28 | 0.13 | 0.25 | 0 | 0.09 | 0 |
| 5 | 0.03 | 0 | 0.03 | 0.03 | 0.06 | 0.16 | 0 | 0 |
| 6 | 0.09 | 0 | 0.16 | 0.13 | 13 | 0 | 0.09 | 0 |
| 7 | .0 | 0 | −0.09 | 0.03 | −0.06 | 0.16 | 0 | 0 |
| 8 | 0.09 | 0 | .31 | 0.09 | .28 | −0.03 | 0.09 | 0 |
| 9 | −0.03 | 0 | −0.13 | 0 | −0.09 | 0.06 | −0.03 | 0 |
| 10 | 0.03 | 0 | 0.06 | 0 | 0.06 | 0 | 0.03 | 0 |
| 11 | 0 | 0 | −0.06 | 0 | −0.03 | 0.09 | 0 | 0 |
| 12 | −0.06 | 0 | −0.03 | −0.13 | −0.06 | −0.16 | −0.03 | 0 |
| 13 | −0.13 | 0 | −0.41 | −0.09 | −0.34 | 0.16 | −0.16 | 0 |
| 14 | 0.19 | 0 | 0.56 | 0.09 | 0.47 | −0.13 | 0.19 | 0 |
| 15 | −0.28 | 0 | −1.16 | −0.03 | −1.06 | 0.22 | −0.28 | 0 |

Class 2 Matrix: AaO&ho (low vowels)

| SW | JO | LR | TC | TBx | TBy | TTx | TTy | LL |
|---|---|---|---|---|---|---|---|---|
| 0 | 0.72 | 0.09 | 2.50 | −0.09 | 1.91 | 0.19 | 1.53 | 0 |
| 1 | −0.28 | 0.16 | −0.44 | 0.16 | −0.66 | 0.16 | −0.28 | 0 |
| 2 | 0.13 | −0.03 | 0.19 | −0.06 | 0.22 | −0.03 | 0.13 | 0 |
| 3 | 0.06 | 0 | 0.13 | 0.09 | 0.16 | 0.06 | 0.06 | 0 |
| 4 | 0 | 0 | 0.16 | 0.37 | 0.19 | 0.19 | 0 | 0 |
| 5 | −0.09 | 0 | −0.13 | 0 | −0.16 | 0 | −0.06 | 0 |
| 6 | 0.03 | 0 | −0.03 | −0.22 | −0.03 | −0.13 | 0.03 | 0 |
| 7 | 0 | −0.06 | 0 | −0.03 | 0.03 | −0.03 | 0 | 0 |
| 8 | 0 | 0.06 | −0.16 | −0.13 | −0.28 | 0 | −0.03 | 0 |
| 9 | 0.09 | −0.09 | 0.13 | −0.22 | 0.25 | −0.19 | 0.09 | 0 |
| 10 | 0.06 | 0 | 0 | 0.13 | −0.06 | 0.09 | −0.03 | 0 |
| 11 | −0.03 | 0 | −0.03 | 0.03 | −0.03 | 0.0 | −0.03 | 0 |
| 12 | 0.03 | 0 | 0 | −0.13 | 0.06 | −0.09 | 0 | 0 |
| 13 | −0.16 | −0.03 | −0.31 | −0.19 | −0.37 | −0.09 | −0.13 | 0 |
| 14 | 0.03 | 0.03 | 0.19 | 0.31 | 0.19 | 0.16 | 0.03 | 0 |
| 15 | −0.19 | 0 | −0.34 | −0.22 | −0.37 | −0.13 | −0.16 | 0 |

Class 3 Matrix: oUuw (back vowels)

| SW | JO | LR | TC | TBx | TBy | TTx | TTy | LL |
|---|---|---|---|---|---|---|---|---|
| 0 | 0.13 | 0.56 | 1.62 | 0.06 | 0.81 | 0.34 | 0.94 | 0 |
| 1 | −0.03 | 0 | −0.06 | −0.03 | −0.06 | 0 | −0.03 | 0 |
| 2 | 0.03 | 0 | 0.09 | −0.03 | 0.25 | −0.06 | 0.03 | 0 |
| 3 | −0.03 | 0 | −0.06 | 0 | −0.16 | 0.03 | −0.03 | 0 |
| 4 | 0.09 | −0.09 | 0.19 | 0.16 | 0.09 | 0.13 | 0.09 | 0 |
| 5 | −0.06 | 0.03 | −0.13 | −0.03 | −0.16 | 0 | −0.06 | 0 |
| 6 | 0.09 | −0.09 | 0.19 | 0.09 | 0.22 | 0.06 | 0.09 | 0 |
| 7 | −0.03 | 0 | −0.06 | 0 | −0.09 | 0 | −0.03 | 0 |
| 8 | −0.03 | 0 | −0.13 | 0.03 | −0.25 | 0.03 | −0.03 | 0 |
| 9 | 0.13 | 0 | 0.25 | 0 | 0.41 | 0 | 0.13 | 0 |
| 10 | −0.03 | 0.03 | −0.03 | −0.06 | 0 | −0.06 | −0.03 | 0 |
| 11 | 0.09 | −0.03 | 0.16 | 0.03 | 0.22 | 0.03 | 0.09 | 0 |
| 12 | 0 | 0 | 0 | 0 | 0 | 0 | 0 | 0 |
| 13 | −0.03 | 0 | −0.09 | −0.06 | −0.03 | −0.06 | −0.03 | 0 |
| 14 | 0 | 0.06 | 0.03 | 0 | 0.09 | 0 | 0 | 0 |
| 15 | 0 | 0 | 0 | 0 | 0.03 | 0 | 0 | 0 |

Class 4 Matrix: Rr (R's)

| SW | JO | LR | TC | TBx | TBy | TTx | TTy | LL |
|---|---|---|---|---|---|---|---|---|
| 0 | −0.06 | 0.16 | 1.53 | 0.25 | 0.44 | 1.37 | −1.06 | 0 |
| 1 | 0 | 0 | 0 | 0 | 0 | 0 | 0 | 0 |
| 2 | 0.03 | 0 | 0 | 0 | 0 | 0 | 0 | 0 |
| 3 | 0.06 | −0.03 | 0.03 | 0 | 0 | 0 | 0.03 | 0 |
| 4 | −0.03 | 0.03 | 0 | 0 | 0 | 0 | 0 | 0 |
| 5 | 0.16 | −0.09 | 0.06 | 0 | 0 | 0 | 0.06 | 0 |
| 6 | 0.03 | 0 | 0 | 0 | 0 | 0 | 0 | 0 |
| 7 | 0 | 0 | 0 | 0 | 0 | 0 | 0 | 0 |
| 8 | −0.41 | 0.25 | −0.19 | 0 | 0 | 0 | −0.19 | 0 |
| 9 | 0.22 | −0.13 | 0.09 | 0 | 0 | 0 | 0.09 | 0 |
| 10 | 0 | 0 | 0 | 0 | 0 | 0 | 0 | 0 |
| 11 | 0.09 | −0.06 | 0.03 | 0 | 0 | 0 | 0.03 | 0 |
| 12 | −0.16 | 0.09 | −0.06 | 0 | 0 | 0 | −0.06 | 0 |
| 13 | −0.09 | 0.06 | −0.03 | 0 | 0 | 0 | −0.03 | 0 |
| 14 | 0.19 | −0.13 | 0.09 | 0 | 0 | 0 | 0.09 | 0 |
| 15 | −0.47 | 0.31 | −0.22 | 0 | 0 | 0 | −0.22 | 0 |

Class 5 Matrix: Ln (L and nasals)

| SW | JO | LR | TC | TBx | TBy | TTx | TTy | LL |
|---|---|---|---|---|---|---|---|---|
| 0 | 0.34 | 0 | 1.44 | −0.47 | 1.53 | −0.03 | −0.50 | 0 |
| 1 | 0 | 0 | 0.37 | 0.50 | 0.03 | 0.31 | −0.41 | 0 |
| 2 | 0 | 0 | 0.06 | 0.09 | 0 | 0.06 | −0.06 | 0 |
| 3 | 0 | 0 | 0.19 | 0.22 | 0 | 0.13 | −0.19 | 0 |
| 4 | 0 | 0 | 0.03 | 0.03 | 0 | 0 | −0.03 | 0 |
| 5 | 0 | 0 | 0 | 0 | 0 | 0 | 0 | 0 |
| 6 | 0 | 0 | −0.28 | −0.37 | −0.03 | −0.22 | 0.31 | 0 |
| 7 | 0 | 0 | −0.50 | −0.66 | −0.06 | −0.41 | 0.53 | 0 |
| 8 | 0 | 0 | 0 | 0 | 0 | 0 | 0 | 0 |
| 9 | 0 | 0 | −0.03 | −0.06 | 0 | −0.03 | 0.03 | 0 |
| 10 | 0 | 0 | 0 | 0 | 0 | 0 | 0 | 0 |
| 11 | 0 | 0 | 0.06 | 0.09 | 0 | 0.06 | −0.09 | 0 |
| 12 | 0 | 0 | 0.06 | 0.06 | 0 | 0.03 | −0.06 | 0 |
| 13 | 0 | 0 | 0.06 | 0.09 | 0 | 0.06 | −0.06 | 0 |
| 14 | 0 | 0 | −0.09 | −0.09 | 0 | −0.06 | 0.09 | 0 |
| 15 | 0 | 0 | −0.03 | −0.03 | 0 | −0.03 | 0.03 | 0 |

Class 6 Matrix and Class 7 Matrix (Null)

| SW | JO | LR | TC | TBx | TBy | TTx | TTy | LL |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 0 | 0 | 0 | 0 | 0 | 0 |

The last two classes in this example are reversed for alternate spectral groupings or additional sub-divisions of spectra into smaller classes where additional distinctions are desired between similar spectra.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A method of determining the values of a series of N articulatory parameters from speech data, comprising the steps of:

creating a plurality of speech phoneme classes, each of said speech phoneme classes including a plurality of speech phonemes sharing similar spectral and articulatory characteristics;

providing a digital speech data signal representative of speech;

selecting data segments of said speech data signal at predetermined sampling intervals according to predefined changes in energy levels in said speech data signal;

transforming said selected data segments into spectral data segments;

converting each of said spectral data segments into said speech phoneme classes so as to generate a weight for the probability that said segment corresponds to phonemes within each of said classes;

converting each of said spectral data segments into a plurality of articulatory parameters for each of said speech phoneme classes so as to generate a series of N parameter values representative of articulatory characteristics in each speech phoneme class; and combining the weight for the probability that spectral data segments correspond to a given speech phoneme class with the output parameter values from each speech phoneme class so as to form a single series of N parameter values for selected data segments.

2. The method of claim 1, further comprising the steps of:

digitizing speech data at a predetermined sampling rate to form digital speech data;

monitoring the energy level of said digital speech data;

selecting segments of said digital speech data for processing at predetermined intervals according to the energy level of said digital signal, said segments comprising a plurality of digital data samples;

boosting the high frequency level of said selected data segments;

applying a window function to said selected data segments;

applying a Fast Fourier Transform to samples in said selected data segments so as to form spectral data segments;

generating the log of the magnitude of said spectral data segments to produce log segments having a logarithmic amplitude scale;

applying a threshold condition to said log segments;

converting each of said log segments into a plurality of speech phoneme vectors so as to generate a weight for the probability that said log segments correspond to spectra within each of said speech phoneme classes;

converting each of said log segments into a plurality of articulatory parameter values for each of said plurality of speech phoneme classes so as to generate a series of N parameter values representative of parameters in each speech phoneme class to which spectra represented by said log segments correspond; and combining the weight for the probability that log segments correspond to a given speech formant class with the output parameter values from each speech formant class so as to form a single series of N parameter values.

3. The method of claim 2 wherein said step of digitizing speech data further comprises the steps of:

receiving audio speech and converting it to analog speech signals;

applying a high-frequency boosting filter to said analog speech signals; and applying a low frequency filter to said analog speech signals to remove frequencies below about 50 Hz.

4. The method of claim 2 wherein said steps of monitoring the energy level and selecting segments of said digital signal for analysis further comprises the steps of:

rectifying said digital speech signal to form an absolute value rectified speech signal;

smoothing said rectified speech signal;

generating a log signal representing the log of the magnitude of said rectified speech signal;

applying said log signal to a delay element to generate an output delayed by a predetermined period;

subtracting the delay element output from the log signal to form a difference signal; and selecting segments from said digital speech signals when said difference signal increases for a predetermined period.

5. The method of claim 4 wherein said step of selecting segments further comprises the steps of:

establishing a sample count;

setting said sample count to zero;

detecting a relative change in said difference signal as each digital sample is presented for analysis;

incrementing the sample count by one;

establishing a rise time count;

recording a count in said rise time count each time said difference indicates an increase in level;

comparing the values of said sample and rise time counts to predetermined count limits; and establishing a predetermined number of digital samples as a segment when said limits are reached; and resetting said counts to zero.

6. The method of claim 4 wherein said smoothing step further comprises applying a relationship defined by:

$$Y_n = (15/16)Y_{n-1} + X_n/16$$

where $X_n$ represents an input digital signal and $Y_n$ represents an output digital signal.

7. The method of claim 2 wherein the step of digitizing comprises sampling an analog speech signal at a sampling rate on the order of at least twice the frequency of interest.

8. The method of claim 2 wherein the step of applying a threshold condition comprises applying a condition that for any input signal $\{Z_k\}$ having a maximum value over a given period of max $\{Z_k\}$, there is a corresponding output signal $P_k$ which is defined as $$P_k = Z_k - (\max \{Z_k\} N)$$

where N represents a dynamic range relative to the maximum value to be retained.

9. The method of claim 2 wherein the step of converting each of said log segments into a plurality of speech phoneme classes comprises the step of multiplying spectral samples in each log segment by a class distinction matrix in the form of a linear transformation matrix having Q columns by R rows, Q being a predetermined number of spectral ranges for sampling purposes and R being a number of spectral classes used, and each element representing a weighting factor for the probability that a given spectral component falls within a given one of said speech phoneme classes, said multiplying producing a raw class vector.

10. The method of claim 9 wherein the step of converting each of said log segments into a plurality of articulation parameters, comprises the step of multiplying spectral samples in each log segment by a plurality of class matrixes, each class matrix being in the form of a linear transformation matrix having S columns by P rows, S being a number of predetermined spectral ranges for sampling purposes and P being equal to the number of articulatory parameters used, and each element represents a weighting factor proportional to the probability that a given spectral component represents a given one of said parameters in the class, said multiplying producing a plurality of class parameter vectors.

11. The method of claim 10 wherein the step of combining comprises the steps of:
normalizing the raw class vector;
multiplying log segments by each of said normalized raw class vector elements separately before multiplying by a class matrix corresponding to said normalized vector element so as to produce a weighted segment input for each class matrix; and
adding all of said parameter vectors to form a single output parameter vector.

12. The method of claim 10 wherein the step of combining further comprises the steps of:
normalizing the raw class vector;
multiplying each of said class parameter vectors by a single element of said normalized raw class vector elements corresponding to a class matrix the parameter vector originates from to produce a plurality of weighted parameter vectors; and
adding all of said weighted parameter vectors to form a single output parameter vector.

13. The method of claim 2 wherein the step of boosting high frequency comprises the step of applying a relationship:

$$Y_n = X_n - \alpha X_{n-1}$$

where $Y_n$ is an output signal, $X_n$ is an input signal and $\alpha$ is typically between 0.5 and 0.7.

14. The method of claim 2 wherein the step of transforming comprises the step of applying a function defined by $$W_n = 0.5 - 0.49 \cos [(\pi/16)n] \text{ for } n = 0 \ldots 31$$

15. The method of claim 2 wherein said step of transforming comprises the step of transforming data samples according to relationship defined by:

$$Z_k = \sum_{n=0}^{31} Y_n e^{-j(2\pi/32)nk}$$

for $k = 0 \ldots 15$ where $Z_k$ represents an output signal and $Y_n$ represents an input signal.

16. The method of claim 1 wherein the step of monitoring the energy level of said digital speech signal further comprises the step of tracking pitch variations in said digital speech signal.

17. The method of claim 1 wherein said step of selecting comprises the step of transferring a predetermined number, D, of digital samples at a time.

18. The method of claim 17 wherein D=32.

19. The method of claim 1 further comprising the steps of:
generating an image representative of a mid-sagital view of a human articulatory tract;
associating said articulatory parameters with corresponding anatomical points on said image; and
altering said image according to variations in said articulatory parameter values.

20. An apparatus for determining the status of a plurality of articulatory parameters from speech data, comprising:
sampling means for sampling speech data at a predetermined sampling rate and for providing speech data sample segments of predetermined length at predetermined sampling intervals based upon changes in energy in said speech data;
a transformation processor connected in series with said sampling means for receiving said speech data sample segments and transforming them from time varying amplitude data into spectral data segments;
first mapping means connected to said transformation processor for associating spectral data in each of said spectral data segments with one or more of a plurality of predefined speech phoneme classes so as to generate a weight for the probability that said segments correspond to spectra within each of said classes;
second mapping means connected in series with said transformation processor and in parallel with said first mapping means for transforming spectral data in each of said spectral data segments into a plurality of articulatary parameters for each of said plurality of classes so as to generate a series of N articulatory parameter values representative of parameters in each class to which spectra represented by said segments correspond; and
combination means connected to said first and second mapping means for combining said weight for the probability of a given class with the series of N articulatory parameters so as to generate a single weighted N parameter output.

21. The apparatus of claim 20 wherein said sampling means comprises:
digitizing means for sampling speech data at a predetermined sampling rate and for forming digital speech data therefrom;
energy monitoring means connected to receive said digital speech data for monitoring changes in energy therein; and
segment selection means connected to said energy monitoring means for selecting segments of said digital speech data of predetermined length at predetermined sampling intervals based upon changes in energy of said digital speech data.

22. The apparatus of claim 21 wherein said energy monitoring means comprises a pitch tracker for tracking pitch variations in the digital speech signals and for providing an output in response to predetermined pitch variations.

23. The apparatus of claim 21 wherein said energy monitoring means comprises:
scaling means for converting said digital speech data to a logarithmic amplitude scale;
a delay line in series with said scaling means for receiving logarithmic scaled digital speech signals and applying a predetermined delay thereto;
summation means connected to an output of said delay means and to said scaling means for adding speech signals to delayed speech data segments; and
trigger means connected between said summation means and said segment selection means for providing a selection signal to said selection means in response to an increase in the energy of said data segments for predetermined numbers of sampling periods.

24. The apparatus of claim 21 further comprising frequency boosting means connected between said segment selection means and said energy monitor means for boosting high frequency components of said speech signals over a predetermined frequency range.

25. The apparatus of claim 24 further comprising windowing means connected in series with said frequency boosting means for applying a predefined windowing function to said selected data segments.

26. The apparatus of claim 24 further comprising log means connected between said transformation means and said first and second mapping means for converting an amplitude of spectral data segments to a logarithmic amplitude scale.

27. The apparatus of claim 20 further comprising threshold means connected between said transformation means and said mapping means for removing spectral data outside of a predefined dynamic range which is measured from a maximum value for data in each group of said spectral values.

28. The apparatus of claim 20 wherein said first mapping means comprises first matrix multiplication means for multiplying said spectral data segments by a predefined class distinction matrix.

29. The apparatus of claim 28 further comprising vector normalization means for receiving an output from said first mapping means and generating a normalized class vector therefrom.

30. The apparatus of claim 20 wherein said second mapping means comprises second matrix multiplication means for multiplying said spectral data segments substantially simultaneously by a plurality of predefined class matrixes.

31. The apparatus of claim 30 wherein said summation means comprises:
a plurality of digital multipliers connected at a first input to said first mapping means and at a second input to said second mapping means so as to receive results of multiplying spectra data by said class association matrix at said first input and of multiplying by each of said class matrixes at a second input with one adder being connected to receive its second input from one class multiplication; and
a digital adder connected to an output of all of said plurality of digital multipliers.

32. The apparatus of claim 20 further comprising third mapping means connected between said transformation processor and said first mapping means for associating spectral data in each of said spectral data segments with one or more of a plurality of predefined spectral subclasses before association with said classes.

33. The apparatus of claim 20 further comprising visual display means connected to said combination means for receiving said articulation parameters and displaying alterations in magnitudes of said parameters substantially simultaneously with an animated visual representation of an anatomical view of a vocal tract.

34. The apparatus of claim 33 wherein said visual display means comprises:
graphics display means for displaying a predefined graphic pattern in the form of a human articulatory system on a visual screen; and
animation means for altering said graphic pattern in response to changes in said articulatory parameters.

35. The apparatus of claim 34 wherein said display means further comprises;
a display area for displaying said human articulatory system in a sectional view.

36. The apparatus of claim 34 further comprising means for displaying numerical values for said articulatory parameters.

37. The apparatus of claim 34 further comprising recording means for storing speech data and for replaying said data when desired.

38. A system for determining values of articulatory parameters that are representative of articulation tract configuration during the production of speech, comprising;
a speech converter for generating a series of speech spectral samples representative of continuous speech;
a plurality of spectral transform means connected in parallel to said speech converter, each of said spectral transform means for establishing a respective speech phoneme class including a plurality of speech phonemes having corresponding spectral and articulatory characteristics and for converting a speech spectrum in its established class into a predetermined set of articulatory parameter values;
a class distinction transform means connected to said speech converter for producing a set of probability values, each probability value of said set representing the probability that a respective speech phoneme class has a speech phoneme represented by said speech spectral sample;
an arrayed combinatory modality connected to said plurality of spectral transform means and to said class distinction transform means for combining each of said articulatory parameter value sets with a respective probability value to produce a plurality of adjusted articulatory parameter value sets; and
a single combinatory modality for combining said plurality of adjusted articulatory parameter value sets into a set of adjusted articulatory parameter values representative of an articulatory tract configuration.

* * * * *

UNITED STATES PATENT AND TRADEMARK OFFICE
CERTIFICATE OF CORRECTION

PATENT NO. : 4,980,917
DATED : December 25, 1990
INVENTOR(S) : SANDRA E. HUTCHINS It is certified that error appears in the above-identified patent and that said Letters Patent is hereby corrected as shown below:

Col. 3, line 65, replace "of" with -- or --;

Col. 9, (Table I, line 117), insert -- 1 -- after "+";

Col. 9, line 30, replace "(Zn" with -- ($Z_n$ --;

Col. 9, line 40, replace "38" with -- 22 --;

Col. 9, line 62, insert a space after "0.5" and before "0.7".

Col. 11, line 63, insert -- . -- after "input";

Col. 15, line 1, delete "]";

Col. 18, line 61, insert "Class Distinction Matrix"; and

Col. 25, line 1, insert -- - -- before "N".

Signed and Sealed this

Twenty-third Day of March, 1993

*Attest:*

STEPHEN G. KUNIN

*Attesting Officer*      *Acting Commissioner of Patents and Trademarks*